UNITED STATES PATENT OFFICE.

GEORG MERLING AND HUGO KÖHLER, OF ELBERFELD, GERMANY, ASSIGNORS TO FARBENFABRIKEN VORM. FRIEDR. BAYER & CO., OF ELBERFELD, GERMANY, A CORPORATION OF GERMANY.

PROCESS OF PRODUCING ISOPRENE.

1,036,875.   Specification of Letters Patent.   Patented Aug. 27, 1912.

No Drawing.   Application filed November 21, 1911. Serial No. 661,534.

*To all whom it may concern:*

Be it known that we, GEORG MERLING and HUGO KÖHLER, doctors of philosophy, chemists, citizens of the German Empire, residing at Elberfeld, Germany, have invented new and useful Improvements in Processes of Producing Isoprene, of which the following is a specification.

We have found that isoprene may be obtained from alpha-beta-dimethylallyldimethylamin by converting the latter (obtainable from alpha-beta-dimethyl-trimethylene-dimethylammonium hydroxid) into the completely alkylated alpha-beta-dimethylallyltrimethyl ammonium base and decomposing this base into isoprene, trimethylamin and water.

The following formulæ illustrate the process which probably takes place:

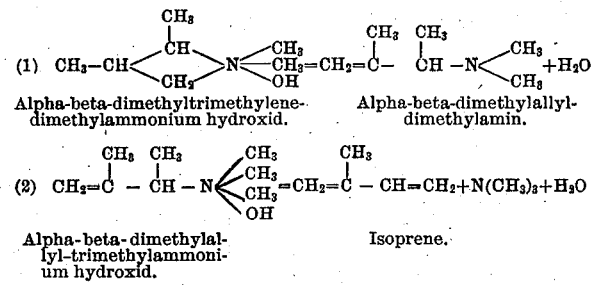

In order to illustrate the new process more fully the following example is given, the parts being by weight:

*First phase of reaction, production of alpha-beta-dimethyl-allyl-trimethylammonium base.*—By treatment with the theoretical amount of freshly prepared silver oxid, alpha-betadimethyltrimethylene-dimethylammonium iodid (melting point 191° C.) in aqueous solution is quickly converted into the corresponding ammonium hydroxid and iodid of silver. The filtered solution is distilled which starts at once the decomposition of the ammonium hydroxid into water and alpha-beta-dimethylallyldimethylamin:

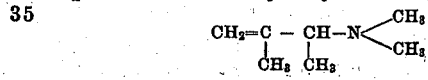

The latter distils over with steam as an oil scarcely soluble in water. The distillate is neutralized with hydrochloric acid or with tartaric acid and then concentrated. The base is liberated by caustic potash, dried over caustic potash and purified by distillation. In simpler and quicker manner the base can be obtained from the alpha-beta-dimethyl-trimethylenedimethyl-ammonium iodid, chlorid, or bromid by heating with an excess of pulverized caustic potash in an oil bath with or without the addition of a small quantity of water and alcohol.

Alpha-beta-dimethylallyldimethylamin is a thin colorless oil with a piperidin like odor, which boils under atmospheric pressure at from 105–106° C. and decolorizes permanganate in dilute sulfuric acid solution. The base combines with methyl iodid under a strong evolution of heat to alpha-beta-dimethyl-allyl-trimethylammonium iodid, which is easily soluble in cold and warm alcohol and crystallizes therefrom in leaves from the melting point 138–140° C. without decomposition.

*Second phase of reaction, decomposition into isoprene.*—Alpha-beta-dimethyl-allyl-trimethylammonium iodid (melting point at from 138–140° C.) is converted into the ammonium hydroxid in the manner described above. This product is decomposed by distilling the aqueous solution, or the ammonium halogenid is directly heated with pulverized caustic potash, calcium oxid or barythydrate under suitable addition of a small quantity of alcohol or water, whereby isoprene is formed with theoretical yield. It is collected in a tube, cooled with ice, separated from trimethylamin by treating it with diluted sulfuric acid, dried over calcium chlorid and purified by distillation over metallic sodium. It boils at from 34 to 35° C.

We claim:—

The process of producing isoprene which comprises completely alkylating alpha-beta-dimethylallyl-dimethylamin, and decomposing the resulting quaternary ammonium compounds, substantially as described.

In testimony whereof we have hereunto set our hands in the presence of two subscribing witnesses.

GEORG MERLING. [L. S.]
HUGO KÖHLER. [L. S.]

Witnesses:
HELEN NUFER,
ALBERT NUFER.